United States Patent
Soukup et al.

(10) Patent No.: US 12,052,141 B2
(45) Date of Patent: Jul. 30, 2024

(54) METHOD FOR OPERATING A CENTRAL OFFICE POINT OF DELIVERY INSTANCE FOR A BROADBAND ACCESS NETWORK OF A TELECOMMUNICATIONS NETWORK

(71) Applicant: Deutsche Telekom AG, Bonn (DE)

(72) Inventors: Robert Soukup, Frankfurt (DE); Thomas Haag, Rodgau (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/557,080

(22) PCT Filed: Apr. 7, 2022

(86) PCT No.: PCT/EP2022/059226
§ 371 (c)(1),
(2) Date: Oct. 25, 2023

(87) PCT Pub. No.: WO2022/228852
PCT Pub. Date: Nov. 3, 2022

(65) Prior Publication Data
US 2024/0214273 A1    Jun. 27, 2024

(30) Foreign Application Priority Data
Apr. 26, 2021  (EP) .................................... 21170498

(51) Int. Cl.
*H04L 41/0895* (2022.01)
*H04L 12/28* (2006.01)
(Continued)

(52) U.S. Cl.
CPC ...... *H04L 41/0895* (2022.05); *H04L 12/2801* (2013.01); *H04L 12/2856* (2013.01);
(Continued)

(58) Field of Classification Search
None
See application file for complete search history.

(56) References Cited

U.S. PATENT DOCUMENTS

| | | | |
|---|---|---|---|
| 11,601,434 B1 * | 3/2023 | Hornsby | H04L 63/0428 |
| 2016/0156513 A1 * | 6/2016 | Zhang | H04W 40/32 |
| | | | 709/220 |

(Continued)

FOREIGN PATENT DOCUMENTS

| | | | |
|---|---|---|---|
| DE | 4084412 B1 * | 3/2024 | |
| WO | 2016032467 A1 | 3/2016 | |
| WO | WO-2016032467 A1 * | 3/2016 | H04L 12/2878 |

OTHER PUBLICATIONS

Larry Peterson et al: "Central Office Re-Architected as a Data Center", IEEE Communications Magazine, Oct. 1, 2016 (Oct. 1, 2016), pp. 96-101, XP055399082, DOI: 10.1109/MCOM.2016. 7588276, Retrieved from the Internet: URL:http://ieeexplore.ieee. org/ielx7/35/7588217/07588276.pdf?tp=&arnumber=7588276 &isnumber=7588217 [retrieved on Aug. 16, 2017].

*Primary Examiner* — Kenny S Lin
(74) *Attorney, Agent, or Firm* — Leydig, Voit & Mayer, Ltd.

(57) ABSTRACT

A method for operating a delivery instance for an access network of a telecommunications network is provided. The delivery instance is connected to a management entity, where the delivery instance and the management entity include a control functionality, a management functionality, a transport functionality, and an edge functionality. The delivery instance includes an access functionality realized by a plurality of access nodes that terminate physical subscriber lines serving end users of the telecommunications network. The delivery instance is operated using a hardware host. The management entity and the hardware host exchange configuration and setup information to bring the (Continued)

delivery instance into operation on the hardware host. The management entity manages the operation of the delivery instance running on the hardware host, the delivery instance operatively realizes access functionality regarding the end users of the telecommunications network using the plurality of access nodes and the physical subscriber lines thereof.

7 Claims, 1 Drawing Sheet

(51) Int. Cl.
    *H04L 41/00*     (2022.01)
    *H04L 41/40*     (2022.01)
    *H04L 47/78*     (2022.01)

(52) U.S. Cl.
    CPC .............. *H04L 41/32* (2013.01); *H04L 41/40* (2022.05); *H04L 47/781* (2013.01)

(56) References Cited

U.S. PATENT DOCUMENTS

| | | | |
|---|---|---|---|
| 2017/0272311 A1* | 9/2017 | Kerpez | H04L 41/142 |
| 2018/0041404 A1 | 2/2018 | Singh et al. | |
| 2018/0041905 A1* | 2/2018 | Ashrafi | H04W 16/10 |
| 2018/0103018 A1* | 4/2018 | Chauhan | H04L 63/0485 |
| 2018/0255463 A1* | 9/2018 | Zheng | G06F 9/45558 |
| 2019/0349249 A1* | 11/2019 | Kerpez | H04L 12/2878 |
| 2020/0028744 A1 | 1/2020 | Rice et al. | |
| 2022/0094594 A1* | 3/2022 | Haag | H04L 41/08 |
| 2023/0345273 A1* | 10/2023 | Peng | H04W 28/10 |

\* cited by examiner

METHOD FOR OPERATING A CENTRAL OFFICE POINT OF DELIVERY INSTANCE FOR A BROADBAND ACCESS NETWORK OF A TELECOMMUNICATIONS NETWORK

CROSS REFERENCE TO RELATED APPLICATIONS

This application is a U.S. National Phase application under 35 U.S.C. § 371 of International Application No. PCT/EP2022/059226, filed on Apr. 7, 2022, and claims benefit to European Patent Application No. EP 21170498.6, filed on Apr. 26, 2021. The International Application was published in English on Nov. 3, 2022 as WO 2022/228852 A1 under PCT Article 21(2).

FIELD

The present invention relates to a method for operating a central office point of delivery instance of or for a broadband access network of a telecommunications network, the central office point of delivery instance being connected to a central office point of delivery management entity.

Furthermore, the present invention relates to a system comprising a central office point of delivery instance and a central office point of delivery management entity for operating the central office point of delivery instance of or for a broadband access network of a telecommunications network, the central office point of delivery instance being connected to the central office point of delivery management entity.

Additionally, the present invention relates to a telecommunications network for operating a central office point of delivery instance of or for a broadband access network of a telecommunications network, wherein the central office point of delivery instance is connected to a central office point of delivery management entity.

Furthermore, the present invention relates to a central office point of delivery instance or a central office point of delivery management entity to be used in an inventive system or in an inventive telecommunications network.

Furthermore, the present invention relates to a program and a computer-readable medium for operating a central office point of delivery instance of or for a broadband access network of a telecommunications network, the central office point of delivery instance being connected to a central office point of delivery management entity.

BACKGROUND

The exchange of packetized information in telecommunications networks, both in fixed-line as in wireless communication systems (or fixed-line communication networks and mobile communication networks) has already grown dramatically and probably will also grow in the future due to the rapid spread of different data services in such communication networks.

In conventionally known architectures of telecommunications networks involving a plurality of central office points of delivery, these central office points of delivery are typically operated by the respective network operator that also provides the backbone network or core network. This means that both levels of service provision are typically bundled, hence creating drawbacks regarding flexibility in providing telecommunication services to customers at different levels.

SUMMARY

In an embodiment, the present disclosure provides a method for operating a central office point of delivery instance for a broadband access network of a telecommunications network is provided. The central office point of delivery instance is connected to a central office point of delivery management entity, and wherein: the central office point of delivery instance comprises a control plane, a management plane, a transport functionality, and an edge functionality, and the central office point of delivery management entity comprises a further control plane, a further management plane, a further transport functionality, and a further edge functionality, the central office point of delivery instance is connected to an access functionality being realized by means of a plurality of access nodes that terminate physical subscriber lines serving end users of the telecommunications network, the central office point of delivery instance being instantiated using a hardware host entity, wherein the central office point of delivery management entity is connected to a further access functionality being realized by means of a plurality of further access nodes that terminate physical subscriber lines serving end users of a further telecommunications network, wherein the method is characterized by the following steps: in a first step, the central office point of delivery management entity and the hardware host entity exchange configuration and setup information to bring the central office point of delivery instance into operation on the hardware host entity, wherein the hardware host entity comprises a virtualization layer and the central office point of delivery instance is operated as a virtualized central office point of delivery on the hardware host entity, wherein the central office point of delivery instance is operated as a satellite central office point of delivery with respect to the central office point of delivery management entity; in a second step, the central office point of delivery management entity manages the operation of the central office point of delivery instance running on the hardware host entity, the central office point of delivery instance operatively realizing access functionality regarding the end users of the telecommunications network using the plurality of access nodes and the physical subscriber lines thereof, wherein managing, by the central office point of delivery management entity, of the operation of the central office point of delivery instance involves the exchange of operational state information via the virtualization layer, and involves at least one out of the following: telemetry and logging functionality, involving monitoring of application and hardware health, quality and/or performance, exchange of non-customer control plane information, exchange of customer-related control information, involving customer authentication information, connection information, and/or product parameters, wherein user plane traffic bypasses the virtualization layer, wherein the user plane traffic bypassing the virtualization layer are session setup and termination information and/or customer payload.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In accordance with an embodiment, the present invention provides a technically simple, effective and cost effective solution for operating a central office point of delivery instance of or for a broadband access network of a telecommunications network, the central office point of delivery instance being connected to a central office point of delivery management entity. In accordance with another embodiment, the present invention provides a corresponding system comprising both a central office point of delivery instance as well as a central office point of delivery management entity for operating the central office point of delivery instance, a corresponding telecommunications network for operating a central office point of delivery instance of or for a broadband access network of the telecommunications network, and a corresponding central office point of delivery instance or central office point of delivery management entity according to the present invention.

In accordance with another embodiment, the present invention provides a method for operating a central office point of delivery instance of or for a broadband access network of a telecommunications network, wherein the central office point of delivery instance is connected to a central office point of delivery management entity, wherein
- the central office point of delivery instance comprises a control functionality or control plane, a management functionality or management plane, a transport functionality or service, as well as an edge functionality or service, and
- the central office point of delivery management entity likewise comprises a further control functionality or control plane, a further management functionality or management plane, a further transport functionality or service, as well as a further edge functionality or service, wherein the central office point of delivery instance comprises or is connected to an access functionality being realized by means of a plurality of access nodes that terminate physical subscriber lines serving end users of the telecommunications network, the central office point of delivery instance being operated or being instantiated using a hardware host entity, wherein the method comprises the following steps:
- in a first step, the central office point of delivery management entity and the hardware host entity exchange configuration and setup information to bring the central office point of delivery instance into operation on the hardware host entity,
- in a second step, the central office point of delivery management entity manages the operation of the central office point of delivery instance running on the hardware host entity, the central office point of delivery instance operatively realizing access functionality regarding the end users of the telecommunications network using the plurality of access nodes and the physical subscriber lines thereof.

It is thereby advantageously possible according to the present invention to provide a solution such that two central office points of delivery (or their respective functionalities) are cascaded, which allows to extend an existing central office point of delivery (hereinafter also called "master central office point of delivery" or central office point of delivery management entity) along a well-defined demarcation line with one satellite central office point of delivery or a plurality of satellite central office points of delivery (hereinafter also called "satellite central office point of delivery" or central office point of delivery instance).

Hence, it is advantageously possible according to the present invention that, at a remote location, it is especially possible to realize the functionality of the satellite central office point of delivery (or central office point of delivery instance) in a comparably easy and straightforward manner. For example, it is possible for a network operator (or carrier) to either use—together with the functionality of the satellite central office point of delivery (or central office point of delivery instance)—its own broadband infrastructure (such as, e.g., fiber infrastructure), or to use infrastructures of, e.g., other network operators, carriers, local utilities, municipal infrastructures or cooperatives. Additionally, the functionality of the satellite central office point of delivery (or central office point of delivery instance) is possible to either be operated by the network operator itself or by the provider of the broadband infrastructure, e.g., another network operator, another carrier, a local utility or municipal provider, or a combination thereof.

Hence according to the present invention, a central office point of delivery instance is operated (of or for a broadband access network of a telecommunications network) by means of the central office point of delivery instance being connected to a central office point of delivery management entity.

Typically, the central office point of delivery instance comprises a control functionality or control plane, a management functionality or management plane, a transport functionality or service, as well as an edge functionality or service, and likewise, the central office point of delivery management entity comprises a further control functionality or control plane, a further management functionality or management plane, a further transport functionality or service, as well as a further edge functionality or service.

Hence, each one of the considered central office points of delivery comprises, respectively, a control functionality or control plane, a management functionality or management plane, a transport functionality or service, as well as an edge functionality or service.

According to the present invention, the central office point of delivery instance is used operatively for or as part of a physical infrastructure, i.e. the central office point of delivery instance comprises or is connected to an access functionality being realized by means of typically a plurality of access nodes that terminate physical subscriber lines serving end users of the telecommunications network.

Furthermore, the central office point of delivery instance is operated or is instantiated using a hardware host entity.

According to the present invention, in order to setting up and operate the central office point of delivery instance, the method comprises the steps of:
- in a first step, the central office point of delivery management entity and the hardware host entity exchange configuration and setup information to bring the central office point of delivery instance into operation on the hardware host entity,
- in a second step, the central office point of delivery management entity manages the operation of the central office point of delivery instance running on the hardware host entity, the central office point of delivery instance operatively realizing access functionality regarding the end users of the telecommunications network using the plurality of access nodes and the physical subscriber lines thereof.

The telecommunications network according to the present invention might be a fixed-line telecommunications network or a mobile communication network but could also have both aspects, i.e. parts of a fixed-line telecommunications network (or being a fixed-line telecommunications network in such parts) and parts of a mobile communication network (or being a mobile communication network in such parts); such networks are also known under the term fixed-mobile-convergence networks (FMC networks).

According to embodiments of the present invention, it is possible that—besides the further control functionality or control plane, the further management functionality or management plane, the further transport functionality or service, and further the edge functionality or service—the central office point of delivery management entity also comprises or is connected to a further access functionality being realized by means of a plurality of further access nodes that terminate physical subscriber lines serving end users of a further telecommunications network.

It is thereby possible according to the present invention that also the central office point of delivery management entity is operatively used to actually serve customers or to be integrated in a broadband access network (especially, but not necessarily, of another telecommunications network compared to the telecommunications network of the central office point of delivery instance).

According to a further embodiment of the present invention, the central office point of delivery instance is operated as a virtualized central office point of delivery on the hardware host entity, especially comprising a virtualization layer and/or the central office point of delivery instance especially comprising its own operating system, especially as part of the virtualization layer, wherein especially the central office point of delivery instance is operated as a satellite central office point of delivery with respect to the central office point of delivery management entity.

Thereby, it is \ possible to efficiently implement the method according to the present invention, and to be able to operate or provide the functionality of the central office point of delivery instance even at remote locations (compared to the locations of the central office point of delivery management entity), and at locations that are not owned by the operator operating the central office point of delivery management entity.

According to a further embodiment of the present invention, the exchange of configuration and setup information between the central office point of delivery management entity and the hardware host entity involves at least one out of the following:

the hardware host entity provides tenant information to the central office point of delivery management entity, especially internet protocol addresses, pieces of information regarding sub-networks and/or information on physical resources, the central office point of delivery management entity triggers the setup of the operating system of the central office point of delivery instance and/or the setup of an orchestrator and/or of the virtualization layer, especially comprising a Kubernetes functionality providing microservice functionality, bringing the central office point of delivery instance into operation by means of using pieces of sub-network information and/or component data regarding the central office point of delivery instance, especially physical and logical addresses and/or capabilities.

Thereby, it is possible to easily and efficiently set up the central office point of delivery instance on the hardware host entity.

Furthermore, according to an embodiment of the present invention, managing, by the central office point of delivery management entity, of the operation of the central office point of delivery instance involves the exchange of operational state information via the virtualization layer, and especially involves at least one out of the following:

telemetry and logging functionality, involving monitoring of application and hardware health, quality and/or performance, especially regarding counters and/or the distribution of events or alarms and/or the transmission of log files, exchange of non-customer control plane information, especially actor requests for software change and/or system or component reboot, exchange of customer-related control information, especially customer authentication information, connection information like bandwidth information and/or line status information, and/or product parameters.

Thereby, it is possible to efficiently operate the central office point of delivery instance and to provide the functionality of the central office point of delivery instance as a service.

According to a further embodiment of the present invention, user plane traffic bypasses the virtualization layer, especially session setup and termination information and/or customer payload.

Thereby, it is possible to use the hardware host entity and its infrastructure as a forwarding plane for the user plane traffic, and the central office point of delivery instance as well as the virtualization layer is not overloaded by such user plane traffic.

Furthermore, according to an embodiment of the present invention, the operational state information is exchanged as part of the payload or inband, and/or wherein the central office point of delivery instance is connected to a core network of the telecommunications network.

Thereby, it is possible to efficiently implement the method according to the present invention.

Furthermore, the present invention relates to a system comprising a central office point of delivery instance and a central office point of delivery management entity for operating the central office point of delivery instance of or for a broadband access network of a telecommunications network, wherein the central office point of delivery instance is connected to the central office point of delivery management entity, wherein the central office point of delivery instance comprises a control functionality or control plane, a management functionality or management plane, a transport functionality or service, as well as an edge functionality or service, and the central office point of delivery management entity likewise comprises a further control functionality or control plane, a further management functionality or management plane, a further transport functionality or service, as well as a further edge functionality or service, wherein the central office point of delivery instance comprises or is connected to an access functionality being realized by means of a plurality of access nodes that terminate physical subscriber lines serving end users of the telecommunications network, the central office point of delivery instance being operated or being instantiated using a hardware host entity, wherein the system is configured such that:

the central office point of delivery management entity and the hardware host entity exchange configuration and setup information to bring the central office point of delivery instance into operation on the hardware host entity, the central office point of delivery management entity manages the operation of the central office point of delivery instance running on the hardware host entity, the central office point of delivery instance operatively realizing access functionality regarding the end users of the telecommunications network using the plurality of access nodes and the physical subscriber lines thereof.

Additionally, the present invention relates to a telecommunications network for operating a central office point of delivery instance of or for a broadband access network of the telecommunications network, wherein the central office point of delivery instance is connected to a central office point of delivery management entity, wherein the central office point of delivery instance comprises a control functionality or control plane, a management functionality or management plane, a transport functionality or service, as well as an edge functionality or service, and the central office point of delivery management entity likewise comprises a further control functionality or control plane, a further management functionality or management plane, a further transport functionality or service, as well as a further edge functionality or service, wherein the central office point of delivery instance comprises or is connected to an access functionality being realized by means of a plurality of access nodes that terminate physical subscriber lines serving end users of the telecommunications network, the central office point of delivery instance being operated or being instantiated using a hardware host entity, wherein the telecommunications network is configured such that:

the central office point of delivery management entity and the hardware host entity exchange configuration and setup information to bring the central office point of delivery instance into operation on the hardware host entity, the central office point of delivery management entity manages the operation of the central office point of delivery instance running on the hardware host entity, the central office point of delivery instance operatively realizing access functionality regarding the end users of the telecommunications network using the plurality of access nodes and the physical subscriber lines thereof.

Additionally, the present invention relates to a central office point of delivery instance or central office point of delivery management entity to be used in an inventive system or in an inventive telecommunications network.

Still additionally, the present invention relates to a program comprising a computer readable program code which, when executed on a computer and/or on a network node of a telecommunications network and/or on a central office point of delivery instance and/or on a central office point of delivery management entity, or in part on the network node of the telecommunications network and/or in part on the central office point of delivery instance and/or in part on the central office point of delivery management entity, causes the computer and/or the network node of the telecommunications network and/or the central office point of delivery instance and/or the central office point of delivery management entity to perform the inventive method.

Furthermore, the present invention relates to a computer-readable medium comprising instructions which when executed on a computer and/or on a network node of a telecommunications network and/or on a central office point of delivery instance and/or on a central office point of delivery management entity, or in part on the network node of the telecommunications network and/or in part on the central office point of delivery instance and/or in part on the central office point of delivery management entity, causes the computer and/or the network node of the telecommunications network and/or the central office point of delivery instance and/or the central office point of delivery management entity to perform the inventive method.

These and other characteristics and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order; this is especially the case for the terms "first step", "second step", etc. It is to be understood that the terms so used are interchangeable under appropriate circumstances and that the embodiments of the invention described herein are capable of operation in other sequences than described or illustrated herein.

Figure 1:
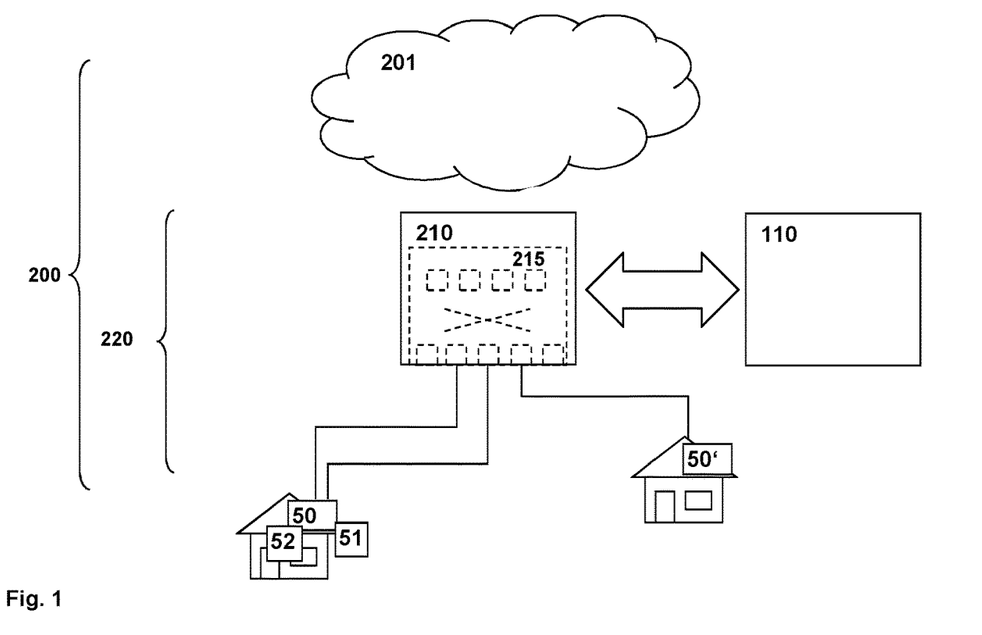
FIG. 1 schematically illustrates a telecommunications network according to the present invention, having a broadband access network, and—as part of the broadband access network—a central office point of delivery functionality realized by means of a central office point of delivery instance, the central office point of delivery instance especially being linked to a central office point of delivery management entity.

In FIG. 1, a telecommunications network 200 according to the present invention is schematically shown, having at least a fixed line part. A mobile (or cellular) part might be present as well, as part of the telecommunications network 100, but is not specifically illustrated in FIG. 1. User equipment or client devices 51, 52 are connected to the telecommunications network 200 by means of a (broadband) access network 220, and the telecommunications network 200 comprises—as part of the broadband access network 220—a central office point of delivery functionality realized by means of a central office point of delivery instance 210, the central office point of delivery instance 210 especially being linked to a central office point of delivery management entity 110. The at least one logical or physical central office point of delivery instance 210 is realized or instantiated within a (mini) data center. The central office point of delivery instance 210 is especially able to handle different access requirements, especially different access possibilities, of the client devices 51, 52 to network functionalities provided by the telecommunications network 200 or via the telecommunications network 200. In addition, the telecommunications network 200 typically also comprises—besides the broadband access network 220—a core network 201. The client devices 51, 52 are typically connected to the logical or physical central office point of delivery instance 210 by means of a customer premises equipment device 50, 50' or by means of a customer premises equipment functionality that might be built into or realized by the client devices 51, 52. In some embodiments, the central office point of delivery instance 210 comprises, or realizes, a switching fabric 215 comprising a plurality of spine network nodes (or virtualized spine network nodes) and typically also a plurality of leaf network nodes (or virtualized leaf network nodes) which are not explicitly represented in FIG. 1.

Figure 2:
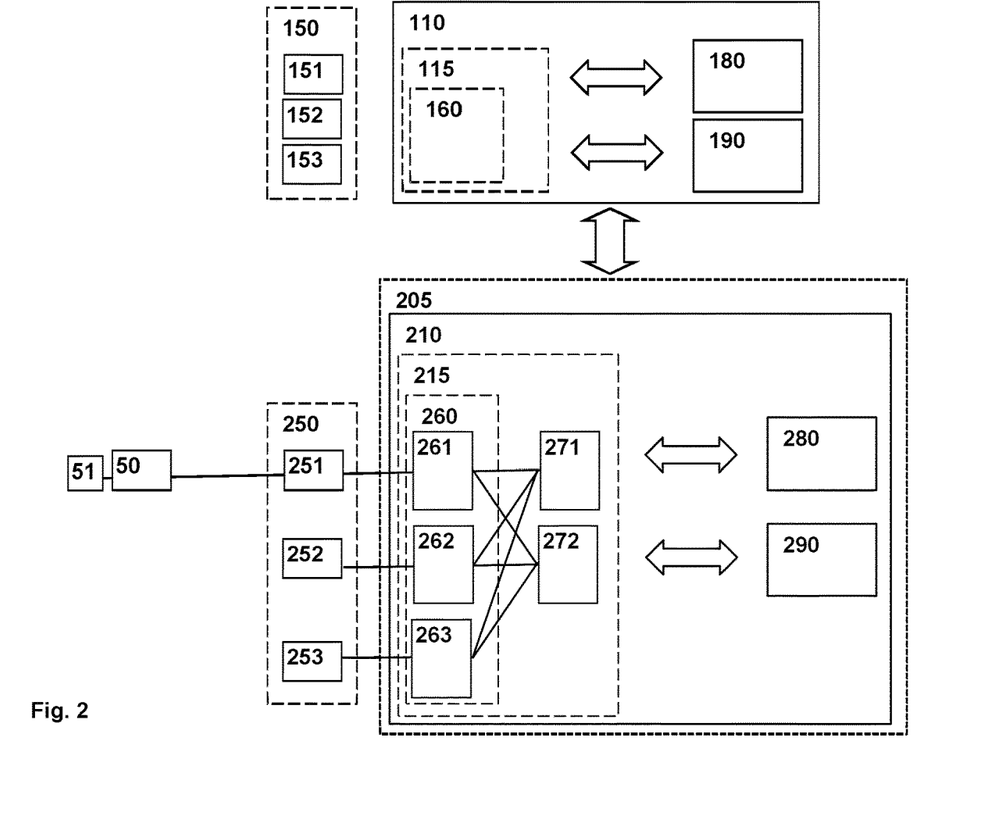
FIG. 2 schematically shows in greater detail the central office point of delivery instance and the central office point of delivery management entity.

FIG. 2 schematically illustrates in greater detail the central office point of delivery instance 210 as part of the broadband access network 220 of the telecommunications network 200, as well as the central office point of delivery management entity 110, wherein the represented part of the telecommunications network 200 comprises—besides a control functionality or control plane 280 (typically comprising a corresponding business support system (BSS) and/or a corresponding operating support system (OSS)), and a management functionality or management plane 290—a plurality of line termination nodes 251, 252, 253 as part of an access functionality 250. In the exemplary representation shown in FIG. 2, also the central office point of delivery management entity 110 comprises a plurality of further line termination nodes 151, 152, 153 as part of a further access functionality 150. In the example represented in FIG. 2, the broadband access network 220 comprises three line termination nodes, a first line termination node 251, a second line termination node 252, and a third line termination node 253. The line termination nodes 251, 252, 253 might be provided to support different access technologies to a home gateway or customer premises equipment or cable modem 50. In the exemplary embodiment shown in FIG. 2, the first line termination node 251 is taken, e.g., as a line termination node in the form of a hybrid fiber coaxial network equipment, supporting to be connected to a hybrid fiber coaxial network, typically comprising a plurality of (passive) coaxial infrastructure access points. In such a situation, a client device 51 (or a plurality of client devices which are not specifically represented in FIG. 2) is (or are) connected to the telecommunications network 200 (i.e. to the first line termination node 251 or hybrid fiber coaxial network equipment) via the cable modem 50 (or customer premises equipment 50 or home gateway device 50). The functionality of the client device 51 and the functionality of the customer premises equipment 50 (or home gateway device 50 or cable modem 50) might be integrated in one device or "box". Nevertheless, these functionalities are represented in FIG. 2 as separated functionalities. In FIG. 2, only one cable modem device 50 (or customer premises equipment 50) (i.e. a specific customer premises equipment), and only one client device 51 are shown. However, also the second and/or third line termination nodes 252, 253 might be realized as hybrid fiber coaxial network equipment, connected to corresponding coaxial infrastructure access points and cable modem devices (not represented in FIG. 2). In the exemplary embodiment of the central office point of delivery instance 210 shown in FIG. 2, the central office point of delivery instance 210 comprises a switching fabric 215 as a transport functionality or service 215 within the central office point of delivery instance 210. The switching fabric 215 (or transport functionality or service 215) comprises a plurality of spine network nodes 271, 272 (or virtualized spine network nodes) and a plurality of leaf network nodes 261, 262, 263 (or virtualized leaf network nodes), the leaf network nodes 261, 262, 263 especially providing the edge functionality or service 260 within the central office point of delivery instance 210. The line termination nodes 251, 252, 253 of the respective access functionality 250 might especially be connected, respectively, to at least two leaf network nodes of the plurality of leaf network nodes 261, 262, 263 within the central office point of delivery instance 210.

Also the central office point of delivery management entity 110 comprises a further control functionality or control plane 180 (typically comprising a business support system (BSS) and/or an operating support system (OSS)), and a further management functionality or management plane 190, as well as it might comprise (and such an embodiment is exemplarily shown in FIG. 2)—as part of the further access functionality 150—a plurality of further line termination nodes 151, 152, 153.

According to the present invention, the central office point of delivery management entity 110 controls the central office point of delivery instance 210 such that the central office point of delivery management entity 110 might be called a master central office point of delivery (or its respective functionality), and the central office point of delivery instance 210 might be called a satellite central office point of delivery (or its respective functionality).

According to the present invention, a method for operating a central office point of delivery instance 210 is provided. The central office point of delivery instance 210 is part of a broadband access network 220 of a telecommunications network 200, and the central office point of delivery instance 210 is connected to a central office point of delivery management entity 110. For example, the central office point of delivery management entity 110 corresponds to a central office point of delivery (functionality), and the central office point of delivery instance 210 also corresponds to a central office point of delivery (functionality). According to the present invention, the two central office points of delivery (or the respective functionality) are cascaded, which allows to extend an existing central office point of delivery (hereinafter also called "master central office point of delivery" or central office point of delivery management entity 110) along a well-defined demarcation line with one satellite central office point of delivery or a plurality of satellite central office points of delivery (hereinafter also called "satellite central office point of delivery" or central office point of delivery instance 210).

If, for example, a carrier or a network operator might install a certain number of central office points of delivery (e.g. a couple of hundreds or about a thousand) in its central offices (i.e. in the locations serving as service providing locations for a certain number of customers of the telecommunications network in the geographical vicinity (of, say, a couple of 100 meters or kilometers to a couple of dozens of kilometers), ranging, e.g. from a couple of hundreds or thousands of customers to few ten thousands of customers), such locations might either host the operator's own (especially fiber) broadband infrastructure, or broadband infrastructure of others players, e.g. other carriers, local utilities, cooperatives etc. Being a carrier or network operator may require large upfront investments and a variety of skills to operate a network. While smaller utilities, villages, local cooperatives etc. might be inclined to cope with the initial infrastructure investment, they are deterred to operate a network continuously, especially "24×7", i.e. around the clock, assuring their clients a certain service level, especially including a maximum failure time period; often, such players lack both the skills and the finances as well as the scale to do this competitively.

According to the present invention, it is possible to provide the central office point of delivery instance (functionality) as a service, i.e. to an infrastructure provider (such as villages, cooperatives, smaller towns, utilities, or carriers) that is willed to build up a new fiber network or open-up their existing networks.

According to the present invention, there is especially the option to apply the "POD as a Service" concept such that: a fully featured central office point of delivery (functionality or instance) or a feature-stripped central office point of delivery (functionality or instance) is provided as a service (especially by means of using the central office point of delivery management entity) as a satellite, wherein such a remote central office point of delivery (functionality or instance), also called a "satellite POD", is connected to a "master POD". The satellite POD is managed and operated remotely; such central office point of delivery functionalities typically might use service controls and IP-connectivity to provide Internet access.

In some embodiments, the present invention offers such "satellite PODs" as fully managed service. This lowers significantly the entry bar for villages, cooperatives, smaller towns, local utilities etc. to become "carriers" themselves and get backbone IP-connectivity to the internet. Hence, it could indirectly stipulate broadband infrastructure rollout in remote areas.

According to the present invention, the exchange of configuration and setup information between the central office point of delivery management entity 110 and the hardware host entity 205 especially involves at least one out of the following:
- the hardware host entity 205 provides tenant information to the central office point of delivery management entity 110, especially internet protocol addresses, pieces of information regarding sub-networks and/or information on physical resources,
- the central office point of delivery management entity 110 triggers the setup of the operating system of the central office point of delivery instance 210 and/or the setup of an orchestrator and/or of the virtualization layer, especially comprising a Kubernetes functionality providing microservice functionality,
- bringing the central office point of delivery instance 210 into operation by means of using pieces of sub-network information and/or component data regarding the central office point of delivery instance 210, especially physical and logical addresses and/or capabilities.

Hence, the setup phase of the central office point of delivery instance 210 especially comprises exchanging (between the hardware host entity 205 (to host the central office point of delivery instance 210) and the central office point of delivery management entity 110) operational data for deploy and actual deploy:
- the hardware host entity 205 provides tenant information to the central office point of delivery management entity 110 (e.g. IP addresses, sub-nets, information on physical resources etc.): The central office point of delivery management entity 110 triggers the setup of the operating system (OS) and orchestrator/virtualization layer (e.g. K8s, Kubernetes), and the deploy of microservices;
- the central office point of delivery instance 210 is brought into operation: The inner sub network information of the central office point of delivery instance 210, as well as component data of the central office point of delivery instance 210 (physical and logical addresses, capabilities if the components do not expose these informations, etc.).

Furthermore according to the present invention, managing, by the central office point of delivery management entity 110, of the operation of the central office point of delivery instance 210 especially involves the exchange of operational state information via the virtualization layer, and especially involves at least one out of the following:
- telemetry and logging functionality, involving monitoring of application and hardware health, quality and/or performance, especially regarding counters and/or the distribution of events or alarms and/or the transmission of log files,
- exchange of non-customer control plane information, especially actor requests for software change and/or system or component reboot,
- exchange of customer-related control information, especially customer authentication information, connection information like bandwidth information and/or line status information, and/or product parameters.

Hence, the operational state (between the central office point of delivery instance 210 and the central office point of delivery management entity 110) is exchanged via the virtualization layer (of the hardware host entity 205 and/or the central office point of delivery instance 210). The management information of the central office point of delivery instance 210 especially include one or a plurality out of the following:
- Telemetry: Application and hardware health, quality, performance, as well as data used for monitoring;
- Metrics: counters, sums, distribution of events;
- Alarms: system triggered events;
- Logs: log files.

Furthermore, end-customer-related control information (such as customer authentication information and/or connection information (e.g., bandwidth, line status)) as well as product parameters is/are exchanged.

Additionally POD non-customer control plane information (such as actor requests for e.g. software change, system and component reboot, scale in/out, etc. all via APIs for both container management and POD internal actors) is exchanged.

User Plane data (such as (user) session set-up and termination information or end customer payload) are not transported via the virtualization layer.

The following scenarios are possible according to embodiments of the present invention:
- the central office point of delivery instance 210 (of a provider B) might be or corresponds to a fully-featured central office point of delivery, located in the premises of a (network or service) provider A, the IP connectivity being likewise provided by this provider A. The central office point of delivery management entity 110 (of provider B) is located at a remote location and controls the central office point of delivery instance 210 (of provider B located in the premises of provider A);
- the central office point of delivery instance 210 (of a provider B) might be or corresponds to a fully-featured central office point of delivery, located in the premises of a (network or service) provider A; however the IP connectivity is provided by provider B. The central office point of delivery management entity 110 (of provider B) is located at a remote location and controls the central office point of delivery instance 210 (of provider B located in the premises of provider A);

the central office point of delivery instance 210 (of a provider B) might be or corresponds to a fully-featured central office point of delivery, located in the premises of provider B; however the IP connectivity (of the central office point of delivery instance 210) is provided by a (network or service) provider A. The central office point of delivery management entity 110 (of provider B) is located at a remote location and controls the central office point of delivery instance 210 (of provider B located in the premises of provider B);

the central office point of delivery instance 210 (of a provider B) might be or corresponds to a satellite central office point of delivery, located either in the premises of provider B or in the premises of a (network or service) provider A; the IP connectivity is likewise provided by this provider A. The central office point of delivery management entity 110 (of provider B) is located at a remote location and controls the central office point of delivery instance 210 (of provider B, located either in its own premises or in the premises of provider A).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a central office point of delivery instance for a broadband access network of a telecommunications network, wherein the central office point of delivery instance is connected to a central office point of delivery management entity, and wherein:

the central office point of delivery instance comprises a control plane, a management plane, a transport functionality, and an edge functionality, and the central office point of delivery management entity comprises a further control plane, a further management plane, a further transport functionality, and a further edge functionality, the central office point of delivery instance is connected to an access functionality being realized by means of a plurality of access nodes that terminate physical subscriber lines serving end users of the telecommunications network, the central office point of delivery instance being instantiated using a hardware host entity, wherein the central office point of delivery management entity is connected to a further access functionality being realized by means of a plurality of further access nodes that terminate physical subscriber lines serving end users of a further telecommunications network, the method comprising:

in a first step, the central office point of delivery management entity and the hardware host entity exchange configuration and setup information to bring the central office point of delivery instance into operation on the hardware host entity, wherein the hardware host entity comprises a virtualization layer and the central office point of delivery instance is operated as a virtualized central office point of delivery on the hardware host entity, wherein the central office point of delivery instance is operated as a satellite central office point of delivery with respect to the central office point of delivery management entity;

in a second step, the central office point of delivery management entity manages the operation of the central office point of delivery instance running on the hardware host entity, the central office point of delivery instance operatively realizing access functionality regarding the end users of the telecommunications network using the plurality of access nodes and the physical subscriber lines thereof, wherein managing, by the central office point of delivery management entity, of the operation of the central office point of delivery instance involves the exchange of operational state information via the virtualization layer, and involves at least one out of the following:

telemetry and logging functionality, involving monitoring of application and hardware health, quality and/or performance, exchange of non-customer control plane information, exchange of customer-related control information, involving customer authentication information, connection information, and/or product parameters, wherein user plane traffic bypasses the virtualization layer, wherein the user plane traffic bypassing the virtualization layer are session setup and termination information and/or customer payload.

2. The method according to claim 1, wherein the exchange of configuration and setup information between the central office point of delivery management entity and the hardware host entity involves at least one out of the following:

the hardware host entity provides tenant information to the central office point of delivery management entity, internet protocol addresses, pieces of information regarding sub-networks and/or information on physical resources, the central office point of delivery management entity triggers the setup of the operating system of the central office point of delivery instance and/or the setup of an orchestrator and/or the setup of the virtualization layer, wherein the virtualization layer comprises a Kubernetes functionality providing microservice functionality, bringing the central office point of delivery instance into operation by means of using pieces of sub-network information and/or component data regarding the central office point of delivery instance, wherein the component data are physical and logical addresses and/or capabilities.

3. The method according to claim 1, wherein the operational state information is exchanged as part of the payload or inband.

4. A tangible, non-transitory computer-readable medium comprising a program with computer readable program code which, when executed in a system causes the system to perform a method according to claim 1.

5. A tangible, non-transitory computer-readable medium comprising instructions which when executed in a system comprising one or more processors causes the system to perform a method according to claim 1, wherein the system comprises a central office point of delivery instance and a central office point of delivery management entity for operating the central office point of delivery instance for a broadband access network of a telecommunications network, wherein the central office point of delivery instance is connected to the central office point of delivery management entity, and wherein:
 the central office point of delivery instance comprises a control plane, a management plane, a transport functionality, and an edge functionality, and
 the central office point of delivery management entity comprises a further control plane, a further management plane, a further transport functionality, and a further edge functionality,
 the central office point of delivery instance is connected to an access functionality being realized by means of a plurality of access nodes that terminate physical subscriber lines serving end users of the telecommunications network, the central office point of delivery instance being instantiated using a hardware host entity, wherein the central office point of delivery management entity is connected to a further access functionality being realized by means of a plurality of further access nodes that terminate physical subscriber lines serving end users of a further telecommunications network,
 wherein the system is configured such that:
 the central office point of delivery management entity and the hardware host entity exchange configuration and setup information to bring the central office point of delivery instance into operation on the hardware host entity, wherein the hardware host entity comprises a virtualization layer and the central office point of delivery instance is operated as a virtualized central office point of delivery on the hardware host entity, wherein the central office point of delivery instance is operated as a satellite central office point of delivery with respect to the central office point of delivery management entity,
 the central office point of delivery management entity manages the operation of the central office point of delivery instance running on the hardware host entity,
 the central office point of delivery instance operatively realizing access functionality regarding the end users of the telecommunications network using the plurality of access nodes and the physical subscriber lines thereof, wherein managing, by the central office point of delivery management entity, of the operation of the central office point of delivery instance involves the exchange of operational state information via the virtualization layer, and involves at least one out of the following:
 telemetry and logging functionality, involving monitoring of application and hardware health, quality and/or performance,
 exchange of non-customer control plane information,
 exchange of customer-related control information, involving customer authentication information, connection information, and/or product parameters, wherein user plane traffic bypasses the virtualization layer, wherein the user plane traffic bypassing the virtualization layer are session setup and termination information and/or customer payload.

6. A system comprising a central office point of delivery instance and a central office point of delivery management entity for operating the central office point of delivery instance for a broadband access network of a telecommunications network, wherein the central office point of delivery instance is connected to the central office point of delivery management entity, and wherein:
 the central office point of delivery instance comprises a control plane, a management plane, a transport functionality, and an edge functionality, and
 the central office point of delivery management entity comprises a further control plane, a further management plane, a further transport functionality, and a further edge functionality,
 the central office point of delivery instance is connected to an access functionality being realized by means of a plurality of access nodes that terminate physical subscriber lines serving end users of the telecommunications network, the central office point of delivery instance being instantiated using a hardware host entity, wherein the central office point of delivery management entity is connected to a further access functionality being realized by means of a plurality of further access nodes that terminate physical subscriber lines serving end users of a further telecommunications network,
 wherein the system is configured such that:
 the central office point of delivery management entity and the hardware host entity exchange configuration and setup information to bring the central office point of delivery instance into operation on the hardware host entity, wherein the hardware host entity comprises a virtualization layer and the central office point of delivery instance is operated as a virtualized central office point of delivery on the hardware host entity, wherein the central office point of delivery instance is operated as a satellite central office point of delivery with respect to the central office point of delivery management entity,
 the central office point of delivery management entity manages the operation of the central office point of delivery instance running on the hardware host entity,
 the central office point of delivery instance operatively realizing access functionality regarding the end users of the telecommunications network using the plurality of access nodes and the physical subscriber lines thereof, wherein managing, by the central office point of delivery management entity, of the operation of the central office point of delivery instance involves the exchange of operational state information via the virtualization layer, and involves at least one out of the following:
 telemetry and logging functionality, involving monitoring of application and hardware health, quality and/or performance,
 exchange of non-customer control plane information,
 exchange of customer-related control information, involving customer authentication information, connection information, and/or product parameters, wherein user plane traffic bypasses the virtualization layer, wherein the user plane traffic bypassing the virtualization layer are session setup and termination information and/or customer payload.

7. A central office point of delivery instance or central office point of delivery management entity to be used in a system according to claim 6.

\* \* \* \* \*